(12) United States Patent
Huber

(10) Patent No.: US 7,906,178 B2
(45) Date of Patent: Mar. 15, 2011

(54) HARDENING AND DRYING OF LACQUER SYSTEMS AND PRINTING COLORS

(75) Inventor: Adalbert Huber, Bensheim (DE)

(73) Assignee: Merck Patent GmbH, Darmstadt (DE)

( * ) Notice: Subject to any disclaimer, the term of this patent is extended or adjusted under 35 U.S.C. 154(b) by 766 days.

(21) Appl. No.: 10/519,354

(22) PCT Filed: Jun. 18, 2003

(86) PCT No.: PCT/EP03/07796
§ 371 (c)(1),
(2), (4) Date: Sep. 22, 2005

(87) PCT Pub. No.: WO2004/003070
PCT Pub. Date: Jan. 8, 2004

(65) Prior Publication Data
US 2006/0084719 A1 Apr. 20, 2006

(30) Foreign Application Priority Data
Jun. 28, 2002 (DE) .................... 102 29 255
Feb. 12, 2003 (DE) .................... 103 05 963

(51) Int. Cl.
*B05D 3/02* (2006.01)
*B05D 3/06* (2006.01)

(52) U.S. Cl. ............... 427/376.2; 106/404; 106/415; 106/420; 106/422; 106/482; 427/192; 427/193; 427/195; 427/212; 427/226; 427/385.5; 427/387; 524/410; 524/413; 524/423; 524/430; 524/431; 524/432; 524/433

(58) Field of Classification Search ............... 427/376.2
See application file for complete search history.

(56) References Cited

U.S. PATENT DOCUMENTS

| | | | |
|---|---|---|---|
| 5,215,580 A * | 6/1993 | Elfenthal et al. | 106/441 |
| 5,350,448 A | 9/1994 | Dietz et al. | |
| 5,411,792 A * | 5/1995 | Yukinobu et al. | 428/212 |
| 5,876,856 A | 3/1999 | Long | |
| 6,416,818 B1 * | 7/2002 | Aikens et al. | 427/383.1 |
| 2005/0236603 A1 * | 10/2005 | Faris | 252/500 |

FOREIGN PATENT DOCUMENTS

| | | |
|---|---|---|
| DE | 4220411 A1 | 12/1993 |
| DE | 4220411 C2 | 12/1993 |
| EP | 0 989 168 | 3/2000 |
| WO | WO 03096384 A2 * | 11/2003 |

* cited by examiner

Primary Examiner — Michael Kornakov
Assistant Examiner — Alexander Weddle
(74) Attorney, Agent, or Firm — Millen, White, Zelano & Branigan, P.C.

(57) ABSTRACT

The invention relates to the use of light-colored or transparent particulate semiconductor materials or particulate substrates that are coated with said semiconductor materials as a hardening and/or drying additive and/or for increasing the thermal conductivity of lacquer systems and printing colors.

28 Claims, No Drawings

HARDENING AND DRYING OF LACQUER SYSTEMS AND PRINTING COLORS

The present invention relates to the use of pale or transparent semiconductor materials as drying or curing additive of surface-coating systems and printing inks.

Many materials are nowadays surface-coated or printed. This enables properties, such as the colour and also the resistance of materials, to be improved. The sometimes long drying times and the high temperature during drying are disadvantageous. In the case of automobile painting, relatively high long drying lines are necessary in order to ensure that the paint has dried before the next paint layer is applied. If the drying time could be shortened, the energy requirement and the length of these drying lines could be reduced, which would be associated with significantly lower production costs.

The object of the present invention is therefore to find a process for accelerating the curing of surface coatings and printing inks which can at the same time be carried out in a simple manner. The curing accelerators should at the same time be easy to incorporate into the surface-coating system or into the printing ink, have high transparency and only be employed in low concentrations.

Surprisingly, it has now been found that the curing and/or drying of surface-coating layers and printing inks can be accelerated by adding finely divided pale or transparent semiconductor materials to the surface coating or printing ink in small amounts. The addition of this curing accelerator has only an insignificant effect, or none at all, on the properties of the surface coating and printing ink.

The curing accelerator furthermore influences the thermal conductivity in the surface coating or in the printing inks. Investigations have shown that the distribution of heat in the surface coating or printing ink is significantly improved.

The invention relates to the use of particulate semiconductor materials or particulate substrates coated with pale or transparent semiconductor materials for the curing and/or drying of surface coatings and printing inks.

The invention furthermore relates to formulations, in particular surface coatings and printing inks, which comprise the semiconductor materials as curing accelerator or drying accelerator and/or for increasing the thermal conductivity.

Suitable pale or transparent semiconductor materials are preferably those which absorb in the IR region. The particulate semiconductor materials are preferably spherical, needle-shaped or flake-form particles or flake-form, spherical or needle-shaped substrates coated with semiconductor materials.

The semiconductor materials are built up homogeneously from pale or transparent semiconductor materials or applied as coating to a particulate substrate. The semiconductor materials are preferably based on oxides and/or sulfides, such as, for example, indium oxide, antimony oxide, tin oxide, zinc oxide, zinc sulfide, tin sulfide or mixtures thereof.

Suitable semiconductor materials generally have particle sizes of 0.01 to 2000 µm, preferably of 0.1 to 100 µm, in particular of 0.5 to 30 µm.

The semiconductor materials either consist homogeneously of the said semiconductors or are particulate, preferably spherical, needle-shaped or flake-form, substrates which have one or more coatings of the said semiconductor materials. The substrates are preferably covered by only one layer.

The substrates may be spherical, flake-form or needle-shaped. The shape of the particles is not crucial per se. In general, the particles have a diameter of 0.01-2000 µm, particularly of 5-300 µm and in particular of 5-60 µm. The particularly preferred substrates are spherical and flake-form substrates. Suitable flake-form substrates have a thickness of between 0.02 and 5 µm, in particular between 0.1 and 4.5 µm. The extension in the other two ranges is generally between 0.1 and 1000 µm, preferably between 1 and 500 µm, and in particular between 1 and 60 µm.

The substrates are preferably natural or synthetic mica flakes, $SiO_2$ flakes, $Al_2O_3$ flakes, glass flakes, aluminium flakes, BiOCl flakes, $SiO_2$ spheres, glass spheres, hollow glass spheres, $TiO_2$ spheres, polymer spheres, for example made from polystyrene or polyamide, or $TiO_2$ needles or mixtures of the said substrates.

The coating of the particulate substrates with the semiconductor materials is either known or can be carried out by processes known to the person skilled in the art. The substrates are preferably coated by hydrolysis of the corresponding metal salts, such as, for example, metal chlorides or metal sulfates, metal alkoxides or carboxylic acid salts in aqueous or conventional solvent solution.

In the semiconductors having a homogeneous structure and also in the substrates coated with one or more semiconductor materials, the semiconductor material preferably has a microcrystalline structure.

Particularly preferred drying and/or curing accelerators are flake-form or spherical tin oxide, antimony oxide, indium-tin oxide (ITO) and mica flakes coated with ITO, tin oxide or antimony oxide, and mixtures of the said oxides.

Particularly preferred drying and/or curing accelerators are transparent or pale semiconductor materials having a powder resistance of <20 $\Omega \cdot m$, preferably of <5 $\Omega \cdot m$.

A particularly preferred curing accelerator is a tin oxide doped with antimony oxide or a substrate coated therewith, such as, for example, a mica flake. Preference is furthermore given to spherical $SiO_2$ particles coated with antimony oxide-doped tin oxide.

Besides antimony, preferably antimony oxide, suitable dopants are the elements of main group 3, 5 and 7, preferably the halides, in particular chlorides and fluorides.

The doping is dependent on the semiconductor material employed and is generally 0.01-30% by weight, preferably 2-25% by weight, in particular 5-16% by weight, based on the semiconductor material.

Furthermore, it is also possible to employ mixtures of curing accelerators, with no limits being set on the mixing ratio.

Preferred mixtures are indium-tin oxides with antimony-doped tin oxides and indium-tin oxide with doped zinc oxides.

It is also possible to add mixtures of two, three or more semiconductor materials to the surface-coating system or printing ink. The total concentration is dependent on the surface-coating or printing-ink composition, but should not be greater than 35% by weight in the application system.

The curing and/or drying accelerator(s) is (are) preferably added to the surface-coating system or printing ink in amounts of 0.01-30% by weight, in particular of 0.1-5% by weight, particularly preferably in amounts of 0.5-4% by weight.

Before application to an article, the curing accelerator is stirred into the surface coating or printing ink. This is preferably carried out using a high-speed stirrer or, in the case of difficult-to-disperse, mechanically insensitive curing accelerators, through the use of, for example, a bead mill or a shaking machine. Other dispersion units known to the person skilled in the art are also possible. Finally, the surface coating or printing ink is physically dried in air or cured by oxidation, condensation, thermally, preferably using IR irradiation.

The curing and/or drying accelerator generally shortens the curing and/or drying times of the surface-coating layer or printing ink to about 10-60% of the original drying time. In particular in the case of printing inks and surface-coating systems which cure or dry by means of IR radiation, significantly shortened drying times are observed.

Surprisingly, it has furthermore been found that the acceleration of the curing also has a highly positive effect on surface-coating layers lying on top. Furthermore, the thermal conductivity within the surface-coating layers is improved.

The invention furthermore relates to printing inks and surface-coating systems which comprise the semiconductor materials as drying and/or curing accelerators. The suitable surface-coating systems include, in particular, thermally curing solvent- or water-based surface coatings, IR coatings, powder coatings, melt coatings, but also film application and plastic welding, as well as solvent-containing or aqueous printing inks for all common types of printing, such as, for example, gravure printing, flexographic printing, letterpress printing, textile printing, offset printing, screen printing, security printing. The surface coatings and printing inks can be either white, coloured or transparent.

The following examples are intended to explain the invention in greater detail, but without limiting it.

EXAMPLES

Example 1a (Comparison)

10% by weight of Kronos 2310 $TiO_2$ ($TiO_2$ pigment having a particle size of about 300 nm), calculated oh the basis of the varnish formulation, are incorporated into a physically drying commercially available polyester/acrylate varnish by dispersal with zirconium dioxide spheres (diameter 3 mm). The dispersal is carried out in a Dispermat at a peripheral speed of 12.6 m/s, 1 hour at 20° C.

Example 1b

8% by weight of Kronos 2310 $TiO_2$ and 2% by weight of drying additive (an antimony oxide-doped tin dioxide having a particle size of about 1 μm), calculated on the basis of the varnish formulation, are incorporated into a physically drying polyester/acrylate varnish analogously to Example 1a by dispersal with zirconium dioxide spheres.

Example 1c

Measurement Results

Varnish samples from Example 1a and 1b are knife-coated wet at a layer thickness of 200 μm onto Q panels. The dry layer thickness is 25±2 μm.

The varnished samples from Example 1a and Example 1b are evaporated off for 5 min and exposed to irradiation with IR radiators having a total power of 3 kW from a distance of 50 cm. The irradiation duration is varied between 5, 10 and 15 min here. The drying/curing is controlled using a Fischerscope microhardness instrument at room temperature immediately after the IR irradiation using a diamond indenter and a final force of 3 mN. Each measurement is carried out three times, and the mean of the individual measurement results is formed.

The measurement results of the microcurings after different duration of the IR irradiation of the varnish samples are indicated numerically in Table 1.

TABLE 1

| IR irradiation duration min | Microhardness/varnish without additive N/mm$^2$ | Microhardness/varnish with additive N/mm$^2$ |
|---|---|---|
| 5 | 24.0 ± 1.2 | 34.0 ± 5.8 |
| 10 | 31.6 ± 1.6 | 37.0 ± 2.6 |
| 15 | 32.2 ± 0.6 | 37.2 ± 2.4 |

It is clearly evident from the microhardness measurements that the addition of the drying additive accelerates the drying/curing of the physically drying varnish. After the varnish sample containing the drying additive has been subjected to IR irradiation for only 5 minutes, the hardness value is greater than that for the varnish sample without additive after IR irradiation for 15 minutes. The addition of the drying additive both significantly shortens the time to the dust-dry state and also improves complete curing of the physically drying varnish.

The invention claimed is:

1. A method for curing or drying of a surface-coating layer or of a printing ink, comprising adding to a surface-coating composition or printing ink in an amount of 0.1-5% by weight based on the surface-coating composition or the printing ink one or more pale or transparent particulate semiconductor materials or one or more particulate substrates coated with one or more pale or transparent semiconductor materials, which absorb in the infrared (IR) region and which accelerate curing or drying the surface-coating layer or printing ink, applying to a surface the ink or the surface-coating composition to form a surface-coating layer and curing or drying the surface-coating layer or ink by IR radiation, with the proviso that the one or more semiconductor materials are not indium-tin oxide (ITO).

2. A method according to claim 1, wherein the one or more pale or transparent particulate semiconductor materials are homogeneous in structure or the one or more pale or transparent semiconductor materials are applied as a coating to a particulate substrate.

3. A method according to claim 1, wherein the particulate semiconductor materials or the particulate substrates are spherical, flake-form or needle-shaped.

4. A method according to claim 1, wherein the semiconductor material is built up oxidically or sulfidically.

5. A method according to claim 1, wherein the substrate is selected from the group consisting of mica flakes, $SiO_2$ flakes, $Al_2O_3$ flakes, glass flakes, aluminium flakes, BiOCl flakes, $SiO_2$ spheres, glass spheres, hollow glass spheres, $TiO_2$ spheres, polymer spheres, $TiO_2$ needles and mixtures thereof.

6. A method according to claim 1, wherein the semiconductor materials are doped.

7. A method according to claim 1, wherein the semiconductor has an amorphous, crystalline or microcrystalline structure.

8. A method according to claim 1, wherein the coating layer is an automobile paint.

9. A method according to claim 1, wherein the curing or drying of a surface-coating layer is achieved.

10. A method according to claim 1, wherein the curing or drying of a printing ink is achieved.

11. A method according to claim 1, which is for shortening the curing and/or drying time of a surface-coating layer or printing ink, comprising adding to a surface-coating composition or the printing ink in an amount of 0.1-5% by weight based on the surface-coating composition or the printing ink one or more pale or transparent particulate semiconductor materials or one or more particulate substrates coated with one or more pale or transparent semiconductor materials to shorten the curing or drying time of the surface-coating layer or printing ink by about 10-60% in comparison to the curing or drying time of the surface-coating layer or printing ink without the one or more pale or transparent particulate semiconductor materials or one or more particulate substrates coated with one or more pale or transparent semiconductor materials, applying to a surface the ink or the surface-coating composition to form a surface-coating layer and curing or drying the surface-coating layer or ink.

12. A method according to claim 11, wherein the curing or drying of a surface-coating layer is achieved.

13. A method according to claim 11, wherein the curing or drying of a printing ink is achieved.

14. A method for curing or drying of a surface-coating layer or of a printing ink, comprising applying to a surface an ink or a surface-coating composition to form a surface-coating layer and curing or drying the surface-coating layer or ink by infrared (IR) radiation,
wherein to the surface-coating composition or printing ink in an amount of 0.1-5% by weight based on the surface-coating composition or the printing ink one or more pale or transparent particulate semiconductor materials or one or more particulate substrates coated with one or more pale or transparent semiconductor materials have been added, wherein the one or more semiconductor materials absorb in the IR region and accelerate curing or drying the surface-coating layer or printing ink, with the proviso that the one or more semiconductor materials are not indium-tin oxide (ITO).

15. A method according to claim 1, wherein the one or more semiconductor materials have a powder resistance of <20 Ω·m.

16. A method according to claim 1, wherein the one or more semiconductor materials have a powder resistance of <5 Ω·m.

17. A method according to claim 1, wherein the one or more semiconductor materials comprise tin oxide doped with antimony oxide or a substrate coated therewith.

18. A method according to claim 1, wherein the one or more semiconductor materials consist essentially of tin oxide doped with antimony oxide or a substrate coated therewith.

19. A method according to claim 1, wherein the one or more semiconductor materials consist of tin oxide doped with antimony oxide or a substrate coated therewith.

20. A method according to claim 1, wherein the substrate is mica flakes or spherical $SiO_2$ particles.

21. A method according to claim 1, wherein the one or more semiconductor materials are doped with antimony, antimony oxide or with a halide.

22. A method according to claim 1, wherein the one or more particulate substrates coated with one or more pale or transparent semiconductor materials have been obtained by the particulate substrates having been coated by hydrolysis of the corresponding metal salts in an aqueous or solvent solution.

23. A method according to claim 1, which comprises adding to a surface-coating composition or printing ink in an amount of 0.1-4% by weight based on the surface-coating composition or the printing ink one or more pale or transparent particulate semiconductor materials or one or more particulate substrates coated with one or more pale or transparent semiconductor materials.

24. A method according to claim 14, wherein the one or more semiconductor materials comprise tin oxide doped with antimony oxide or a substrate coated therewith.

25. A method according to claim 14, wherein the one or more semiconductor materials consist essentially of tin oxide doped with antimony oxide or a substrate coated therewith.

26. A method according to claim 14, wherein the one or more semiconductor materials consist of tin oxide doped with antimony oxide or a substrate coated therewith.

27. A method according to claim 1, wherein the one or more semiconductor materials comprise antimony oxide doped tin oxide having a particle size of 0.5 to 30 μm.

28. A method according to claim 14, wherein the one or more semiconductor materials comprise antimony oxide doped tin oxide having a particle size of 0.5 to 30 μm.

* * * * *